United States Patent [19]

Stevenson et al.

[11] Patent Number: 4,849,075

[45] Date of Patent: Jul. 18, 1989

[54] METHOD OF ISOTOPE ENRICHMENT

[75] Inventors: Gerald R. Stevenson; Matthew P. Espe, both of Normal; Richard C. Reiter, Bloomington, all of Ill.

[73] Assignee: The Board of Regents of Illinois State University, Normal, Ill.

[21] Appl. No.: 826,568

[22] Filed: Feb. 5, 1986

[51] Int. Cl.$^4$ .................... B01D 59/00; B01D 59/38; B01D 59/50

[52] U.S. Cl. ................................ 204/157.2; 204/1.5; 423/6

[58] Field of Search ...................... 204/157.20, 157.21, 204/157.22, 1.5; 585/941; 423/3, 8, 10, 6, 7

[56] References Cited

U.S. PATENT DOCUMENTS

| | | | |
|---|---|---|---|
| 4,129,481 | 12/1978 | Aubert et al. ........................ | 204/1.5 |
| 4,176,025 | 11/1979 | Chen et al. ........................ | 204/157.1 |
| 4,202,860 | 5/1980 | Miyake et al. ........................ | 423/6 |

OTHER PUBLICATIONS

R. T. Morrison et al., *Organic Chemistry*, Boston, Allyn and Bacon, 4th Ed., 1959, pp. 294–297.

Chang, Raymond and Coombe, Robert; "Effects of Deuterium Substitution on the Electron-Transfer Reactions", Journal of Physical Chemistry, 1971; 75; No. 3; 447 to 448.

Knochel, A. et al., "Isotopic Shifts in Chemical Exchange Systems. . .", J. AM. Chem. Soc. 1981, 103, 5707–5711.

Heumann, K. G. et al., "Calcium Isotope Separation on an Exchange Resin Having Cryptand Anchor Groups", Agnew, Chem. Int. Ed. Engl.; 19:5, 406–407.

Sessions, R. B.; "Crown Ethers and Cryptands"; McGraw-Hill Encyclopedia of Chemistry, Ed. Parker, S. P.; 1983; New York; 235–238.

Lawler, R. G. et al., "Relative Stabilities of Alkylbenzene Negative Ions"; J. Amer. Chem. Soc.; 91:20 1969, 5671–5672.

Jordan, K. D.; "The Relative Stability of Alkyl-Substituted Benzene Anions in the Gas Phase", J. Amer. Chem. Soc.; 98:5; 1976; 1295–1296.

Stevenson, G. R. et al., "Enthaply of Steric Inhibition to Solvation Due to tert-Butyl Groups on an Anion Radiacal", J. Amer. Chem. Soc.; 103:22; 1981; 6558–6562.

Stevenson, G. R. et al.; "Diminished Solution Electron Affinities of $^{13}$C-and Deuterium-Substituted Anion Radical Precursors Allow Isotope Enrichment"; J. Amer. Chem. Soc.; 108; 1986; 532–533.

Stevenson, G. R. et al.; "Isotopic Enrichments via Altered First and Second Solution Electron Affinities"; J. Amer. Chem. Soc.; 108:19; 1986; 5760–5762.

Stevenson, G. R. et al.; "Enhancement of Radioactivity of $^{14}$C-$^{12}$C Mixtures via Partial Reduction"; J. Amer. Chem. Soc.; 108; 1986, 5366.

Stevenson, G. R. et al.; "Isotopic Enrichment by Electron Exchange"; Nature; 323; 1986; 522–523.

Peterson, I.; "Separating Isotopes by Switching Electrons"; Science News; 130, p. 292, Nov. 8, 1096.

*Primary Examiner*—John F. Terapane
*Assistant Examiner*—Virginia B. Caress
*Attorney, Agent, or Firm*—Lundy and Walker

[57] ABSTRACT

A method of isotope enrichment comprises providing a mixture of at least two isotopic compounds of a reactant. One of the components having a greater percentage of a selected isotope than the other. An electron transfer agent is introduced into the mixture to form a reaction mixture. The electron transfer agent facilitates the transfer of electrons interactive with nuclei of the selected element in the reactant. The transfer agent is in an amount sufficient upon reaction of the reaction mixture to establish an equilibrium between an electron rich reaction product and an electron poor reaction product. The reaction mixture is reacted until the equilibrium is established. Molecules of the electron poor reaction product are then separated from molecules of the electron rich reaction product.

33 Claims, No Drawings

METHOD OF ISOTOPE ENRICHMENT

BACKGROUND OF THE INVENTION

This invention relates to methods of enriching isotopes of an element, and in particular, to a method of isotope enrichment by separation of an electron rich reaction product from an electron poor reaction product.

An isotope is one of two or more kinds of atoms of an element, which have different mass numbers, that is different numbers of neutrons in their nuclei, but the same number of protons. For example hydrogen has three isotopes $H^1$, $H^2$ (deuterium), and $H^3$ (tritium).

In this application, "isotopic compound" shall refer to each molecule or population of molecules of a compound which differs from other molecules or populations of molecules of that compound in composition and location on the molecule of isotopes of a selected element or elements. For example, in a compound which has only one atom of a selected element per molecule and only one possible isomer of the molecule, the number of isotopic compounds would equal the number of different isotopes of the element present. If there was more than one atom of a selected element per molecule/or more than one possible isomer, the number of isotopic compounds would be increased by the various possible combinations of different isotopes present and/or different locations of those isotopes in the molecules of the reactant.

In this application, "anion" shall refer to a negative ion of any charge. In this application "cation" shall refer to a positive ion of any charge.

Various procedures have been used to separate or enrich isotopes of elements. In diffusion procedures, isotopes incorporated in gases are allowed to diffuse, across a barrier under pressure or across a thermal gradient. Phase related separation procedures are based on an equilibrium between two phases such as gas and liquid. Electrolysis has been used as an isotope separation procedure at least for the production of heavy water. Electromagnetic processes separate ions of isotopes in the same manner as a mass spectrometer. Centrifugation separates isotopes on the basis of mass. Laser procedures separate isotopes by an excitation process followed by electromagnetic separation. Chromatographic procedures separate isotopic species on the basis of differential passage through a chromatographic medium such as in a high pressure liquid chromatographic column. Within the column the isotopic species exchange between a fixed phase and a mobile phase at different rates.

These procedures generally have limited applicability, and are involved, time consuming and expensive.

It is therefore highly desirable to provide an improved method of isotope enrichment.

It is also highly desirable to provide an improved method of isotope enrichment that requires a limited amount of equipment.

It is further highly desirable to provide an improved method of isotope enrichment that has general applicability to separation of isotopes of a large number of elements.

It is also highly desirable to provide an improved method of isotope enrichment that can be relatively fast and relatively inexpensive.

It is finally highly desirable to provide a method of isotope enrichment which provides all of these desired features.

SUMMARY OF THE INVENTION

It is therefore a preliminary object of this invention to provide an improved method of isotope enrichment.

It is also an object of this invention to provide an improved method of isotope enrichment that requires a limited amount of equipment.

It is another object of the invention to provide an improved method of isotope enrichment that has general applicability to separation of isotopes of a large number of elements.

It is also a purpose of this invention to provide an improved method of isotope enrichment that is relatively fast and relatively inexpensive.

It is finally also a purpose of this invention to provide an improved method of isotope enrichment which provides all of the above indicated objects.

In the broader aspects of this invention there is provided a method of isotope enrichment comprising: providing a mixture of at least two isotopic compounds of a reactant, one of the compounds having a greater percentage of a selected isotope than the other. An electron transfer agent is introduced into the mixture to form a reaction mixture. The electron transfer agent facilitates the transfer of electrons interactive with nuclei of the selected element in the reactant. The transfer agent is in an amount sufficient upon reaction of the reaction mixture to establish an equilibrium between an electron rich reaction product and an electron poor reaction product. The reaction mixture is reacted until the equilibrium is established. Molecules of the electron poor form of the compound are then separated from molecules of the electron rich form of the compound.

DESCRIPTION OF A SPECIFIC EMBODIMENT

In the method of isotope enrichment or separation of the invention an electron transfer agent is introduced into a mixture of a reactant containing at least two different isotopic compounds of a selected element to form a reaction mixture, which is then reacted to equilibrium. The electron transfer agent is in an amount sufficient to establish an equilibrium between an electron rich reaction product and an electron poor reaction product. For example in one embodiment of the method of the invention, the electron rich reaction product would be relatively reduced or reacted and the electron poor reaction product relatively unreduced or un-reacted. The electron rich reaction product is a mixture of at least two isotopic compounds. The electron poor reaction product is a mixture of at least two isotopic compounds. The equilibirum between the electron rich reaction product and the electron poor reaction product is composed of equilibria between each electron rich reaction product and each electron poor reaction product of each isotopic compound of the reactant. In one preferred embodiment of the method of the invention, the equilibrium between the electron rich reaction product and the electron poor reaction product can be represented by the formulas:

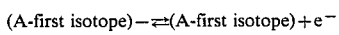

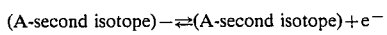

and:

(A-first isotope)− +(A-second isotope)⇌

(A-first isotope)+(A-second isotope)−

(A-first isotope)+(A-second isotope)−⇌

(A-first isotope)− +(A-second isotope)

After the equilibrium is established the electron poor reaction product and the electron rich reaction product are separated.

The method of the invention provides a process for separating different isotopes of an element. The process can be applied to naturally occuring mixtures of isotopes or enriched mixtures. The method provides at least two fractions of product: a fraction enriched in a selected isotope and a fraction depleted in a selected isotope. For example, the mixture of isotopic compounds of the electron poor reaction product of an embodiment of the method of the invention might be enriched in a selected isotope and the mixture of isotopic compounds of the electron rich reaction product of that embodiment depleted in that isotope. Further enrichment of the enriched fraction by the method of the invention is possible, although it may be necessary to reconstitute the reactant before continuing. It is believed that the method of the invention is applicable to most or a great many elements.

The method of the invention may be carried out at least through the reacting step in gas, liquid, or solid phase. The examples include the method of the invention carried out in each of these phases. Where air would interfere with the method of the invention the method of the invention must be carried out under vacuum or inert atmosphere.

The method of the invention may be carried out in solution. In that case, the method of the invention includes the step of solubilizing the mixture of isotopic species of the reactant. The method may include disbursing the reactant prior to solubilizing or by solubilizing or otherwise. There are few limitations on the choice of a solvent; one limitation on the solvent is that it not cause side reactions with the reactant or the reaction products which would prevent the reaction or destructively interfere with the equilibrium. For example, if the electron transfer agent is a reducing agent, liquid sulfur dioxide and strong Lowry-Bronsted acids would not be preferred solvents.

The compound chosen as a reactant for the method of the invention depends upon the elements of interest. The compound must be capable of being bonded to the selected element. That bonding must be characterizable as covalent as opposed to ionic or hydrogen bonding. The reactant is not limited to a mixture of isotopic compounds of one compound but may include a mixture of isotopic compounds of two or more different compounds, preferrably with similar electron affinities. The reactant of the method of the invention need not be a stable compound but can instead be a reaction intermediate such as a free radical.

It is preferable that the reactant of the method of the invention not be a Lowry-Bronstead acid since protons of such acids interfere with electron transfer, but the reactant may be a Lewis acid.

The reactant of the method of the invention is preferably a conjugated compound, that is an organic or inorganic compound that may be described as having delocalized molecular orbitals.

The reactant may be a hydrocarbon. The hydrocarbon cannot be safturated but must rather have at least an unsaturated portion. In an embodiment of the method of the invention in which the hydrocarbon has a saturated portion and an unsaturated portion the atoms of the selected element are in proximity to the unsaturated portion.

Space does not permit a list all the classes of compounds that could be used as reactants or could supply the reactant as a reaction intermediate, however some of the classes are the following: polyaromatics; acetylenes; nitoaromatics; aldehydes; conjugated ketones; aromatic amines; quinones; carboxylic esters; metallocenes such as ferrocene and ferrocene analogs containing osmium, manganese, chromium, ruthenium or cerium; lactones; annulenes; nitriles; boronitroxides; conjugated alkenes; cyclopentadiene metalnitroxides containing nickel, palladium or platinum; esters; organophosphorus; metallocarbonyls such as cyclopentadiene metalcarbonyls containing manganese, or molybdenium, and arene metal carbonyls like COT [cyclooctatetraene] molybdenum tricarbonyl, or COT metal tricarbenyls containing chromium, cobalt, or tungsten; organometallics; heterocycles; steroids; conjugated silicons; sulfones; flurocarbons; sulfoxides; bis arenes such as bis benzene chromium, bis benzene dichlorotitanium and mixed bis arenes.

In the method of the invention an electron transfer agent is introduced into the mixture to form a reaction mixture. The electron transfer agent may be any agent that facilitates the transfer of electrons to or from the reactant. The electron transfer agent can be an electrolytic current, a reducing agent, or an oxidizing agent. It is not possible to list all possible electron transfer agents, however examples of possible classes of reducing agents are: alkali metals, alkaline earth metals, and strong electron donating bases such as hydroxides, alkoxides, alkyllithium and naphthalenides or mixtures of reducing agents. Examples of oxidizing agents are oxidizing acids such as sulfuric acid, and nitric acid and strong Lewis acids such as aluminum chloride, aluminum bromide, gallium chloride, bromic acid, antimony pentafluoride, antimony pentachloride, or mixtures of oxidizing agents.

The electron transfer agent facilitates transfer of electrons interactive with nuclei of the selected element within the reactant. The transferred electrons are interactive with the delocalized molecular orbitals of the reactant. In some embodiments of the method of the invention the transferred electrons are interactive with $\pi$ molecular orbitals of the reactant.

The electron transfer agent is added in an amount sufficient to transfer a significant number of electrons but insufficient to drive the reaction of the method to completion. The electron transfer agent is preferrably in an amount sufficient to establish an equilibrium between a substantial amount of an electron rich reaction product and a substantial amount of an electron poor reaction product.

In a specific embodiment of the invention the number of electrons transferred is sufficient to provide a calculated ratio of electron rich reaction product to electron poor reaction product of between about 2:1 and 1:2. In another embodiment of the method of the invention, the ratio of electron rich reaction product to electron poor reaction product is between about 2:3 and 3:2. In another embodiment of the method of the invention, the ratio of electron rich reaction product to electron poor reaction product is about 1:1.

The reactant may become the electron rich reaction product or the electron poor reaction product depending upon the reaction performed. Each isotopic compound in the mixture of the rectant will participate in the equilibrium between electron rich reaction product and electron poor reaction product. The electron rich reaction product and the electron poor reaction product can be in a variety of forms, for example: neutral molecule and cation, anion and neutral molecule, neutral radical and cation, neutral molecule and cation radical, anion and neutral radical, anion radical and neutral molecule.

The reaction of the reaction mixture is carried out until the equilibrium is established. The reaction must transfer electrons to or from the reactant depending on the reactant used and the reaction products sought. An oxidation-reduction reaction is a preferred reaction. As is indicated by the statement that an equilibrium is established between the electron rich reaction product and the electron poor reaction product, the reaction products must remain in a form during the reaction such that the equilibrium can be established between them. The reaction thus must be "reversible" and the electron rich reaction product and the electron poor reaction product stable enough to allow the establishment of the equilibrium. Thus, for example, a reaction in which one of the reaction products was removed, such as by fast precipitation, would not be preferred.

After the equilibrium is established between the electron rich reaction product and the electron poor reaction product the electron rich reaction product is separated from the electron poor reaction product. Reactivities of electron rich forms of compounds and electron poor forms of compounds vary greatly, particularly where one of the forms is a radical or ionic and the other is not. This difference in reactivities may be used to preferentially react either the electron rich reaction product or the electron poor reaction product. The reaction products may also be separated by methods that rely on other differences between the electron poor reaction product and the electron rich reaction product, such as differences in charge.

The separation of the electron poor reaction product and the electron rich reaction product results in a separation of the selected isotopes. An enrichment of a selected isotope over another non-selected isotope of the selected element is present in either the electron poor reaction product or the electron rich reaction product.

A theoretical explanation of what is occuring in the method of the invention can be provided, however, the invention is not limited by theory. Substitution of one isotope by another in the reactant of the method of the invention substantially alters the electron affinity and ionization potential and oxidation potential and the equilibria between each electron rich reaction product and each electron poor reaction product of each isotopic compound. The change in electron affinity is due to a combination of electronic and zero point energy effects within the molecule. If the reaction is carried out in solution there may be in addition solvent/counter-ion effects.

The following examples illustrate the present invention.

EXAMPLE I

Seventy-five milligrams of a 50/50 by-weight mixture of naphthalene (NP) and naphthalene-d$^8$ (NP-d$^8$) was sealed within a glass capillary tube as reactant. The capillary tube was placed within a glass bulb and a deficient amount of potassium metal, as an electron transfer agent, was distilled with the use of a bunsen burner, under vacuum, into the bulb creating a potassium mirror on the sides of the bulb.

Approximately 5 milliliters of tetrahydrofuran (THF) was distilled into the bulb having therein the naphthalene containing capillary tube, under vacuum, from a another bulb containing THF over sodium-potassium alloy used for drying the THF. After the THF was distilled over, the bulb was sealed and shaken until the capillary tube was broken. The solid naphthalene and naphthalene-d$^8$ were allowed to dissolve into the THF. The bulb then was tipped to pour the solution over the potassium mirror. The potassium mirror was dissolved and the solution became a dark green color.

The bulb was then submerged in 600 milliliters of deionized and distilled water and broken open, allowing the solution to react. The reaction of the THF solution with the water provided a Birch reduction of the anion radicals of NP and NP-d$^8$ according to the following reaction.

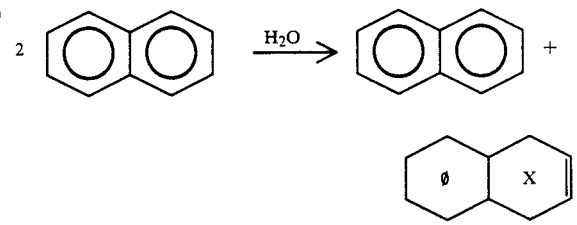

The aqueous solution was transferred to a separatory funnel and washed with diethyl ether. The ether extract was dried over sodium sulphate (Na$_2$ SO$_4$). The ether solution was decanted off the drying agent and a fractional distillation performed to remove all except approximately 5 milliliters of the ether. The remaining ether was removed by blowing nitrogen gas over it, leaving an oily mixture.

The oily mixture was dissolved in hexane and placed dropwise in a straight line on a six inch by six inch silica thin layer chromatography plate about 1½ inches from the bottom. The plate was placed in a thin layer chromatography bath filled with hexane to just below the extract line. The thin layer chromatography plate was retained in the thin layer chromatography bath until the hexane reached the top of the plate. A separation of a main portion of the extract from impurities was observed under ultraviolet light.

The neutral aromatic hyrocarbon and the dihydro aromatic hydrocarbon do not separate in the thin layer chromatography, however, they could have been separated by standard techniques relying on liquid chromatography, gas chromatography, solvent solubility or distillation.

The silica of the thin layer chromatography plate containing the main portion of the product was removed from the glass of the chromatography plate, broken into small pieces and dissolved in chloroform. The silica was removed by filtration and the chloroform removed by fractional distillation of all but about 5 milliliters, followed by removal of the remaining chloroform by blowing nitrogen gas over the extract.

The remaining insoluble extract was placed in a vacuum sublimator containing dry ice/acetone in its inside tube and the sublimator was connected to vacuum for about two hours. Solid white crystals which collected in the sublimator were removed and placed into a capillary tube, which was then sealed. The above steps were then repeated. The capillary tube containing the white crystals was placed within a glass bulb with an excess amount of potassium metal, as electron transfer agent, and was distilled with the use of a bunsen burner, under vacuum, into the bulb creating a potassium mirror on the sides of the bulb. Approximately 5 milliliters of tetrahydrofuran (THF) was distilled into the bulb containing the white crystals, under vacuum, from another bulb containing THF over sodium-potassium alloy used for drying the THF. After the THF was distilled over, the bulb was sealed and shaken until the capillary tube was broken. The solid material was allowed to dissolve in the THF. After the solid material had dissolved, the bulb was tipped to pour the solution over the potassium mirror. The potassium mirror was dissolved to form a solution.

The bulb was then submerged in 600 milliliters of deionized and distilled water and broken open, allowing the solution to react with the water. The reaction of the THF solution provided a Birch reduction of the anion radicals with water.

The aqueous solution was transferred to a separatory funnel and washed with diethyl ether. The ether extract was dried over sodium sulphate ($Na_2SO_4$). The ether solution was decanted off the drying agent and a fractional distillation performed to remove all except approximately 5 milliliters of the ether. The remaining ether was removed by blowing nitrogen gas over it, leaving an oily mixture.

The oily mixture was dissolved in hexane and placed dropwise in a straight line on a six inch by six inch silica thin layer chromatography plate about 1½ inches from the bottom. The plate was placed in a thin layer chromatography bath filled with hexane to just below the extract line. The thin layer chromatography plate was retained in the thin layer chromatography bath until hexane reached the top of the plate. A separation of the main portion of the extract from impurities were observed under ultraviolet light.

The neutral aromatic hydrocarbon and the dihydro aromatic hydrocarbon do not separate in the thin layer chromatography, however, they could have been separated by standard techniques relying on liquid chromatography, gas chromatography, solvent solubility or distillation.

The silica of the thin layer chromatography plate containing the main portion of the product was removed from the glass of the chromatography plate, broken into small pieces and dissolved in chloroform. The silica was removed by filtration and the chloroform removed by fractional distillation of all but about 5 milliliters, followed by removal of the remaining chloroform by blowing nitrogen gas over the extract.

The remaining soluble aromatic material was placed in a vacuum sublimator containing dry ice/acetone in its inside tube and the sublimator was connected to vacuum for about two hours. Solid crystals were again collected. An electron spin resonance spectra was taken of the crystals and compared to spectra simulated by computer in accordance with: Stevenson, Reiter, and Sedgwick, "Thermal Generation Of The [16]-Annulene Anion Radical From the [8]-Annulene Anion Radical" 105 Journal Of The American Chemical Society 6521, (1983) to provide quantification. A ratio of naphthalene to naphthalene-$d^8$ of 0.8:1 was obtained. Thus there was a greater amount of NP anion radical than NP-$d^8$ anion radical and more NP was converted to the dihydro form than NP-$d^8$.

EXAMPLE II

Seventy-five milligrams of a 50/50 by-weight mixture of naphthalene (NP) and naphthalene-$d^8$ (NP-$d^8$) were sealed within a glass capillary tube as reactant. The capillary tube was placed within a glass bulb and excess potassium metal, as an electron transfer agent, was distilled with the use of a bunsen burner, under vacuum, into the bulb creating a potassium mirror on the sides of the bulb.

Approximately 5 milliliters of tetrahydrofuran (THF) was distilled into the bulb having therein the naphthalene containing capillary tube, under vacuum, from another bulb containing THF over sodium-potassium alloy used for drying the THF. After the THF was distilled over, the bulb was sealed and shaken until the capillary tube was broken. The solid naphthalene and naphthalene-$d^8$ were allowed to dissolve into the THF. The bulb was tipped to pour the solution over the potassium mirror. The potassium mirror then dissolved and the solution became a dark green color.

The bulb was then submerged in 600 milliliters of deionized and distilled water and broken open, allowing the solution to react.

The reaction of the THF solution provided a Birch reduction of the anion radicals of NP and NP-$d^8$ with water.

The aqueous solution was transferred to a separatory funnel and washed with ethyl ether. The ether extract was dried over sodium sulphate ($Na_2 SO_4$). The ether solution was decanted off the drying agent and a fractional distillation performed to remove all except approximately 5 milliliters of the ether. The remaining ether was removed by blowing nitrogen gas over it, leaving an oily mixture.

The oily mixture was placed in a sintered glass funnel and washed with 5 ten milliliter aliquots of glacial acetic acid. This removed the dihydro products of the Birch reduction since they are soluble in the acid and the aromatic compounds are not.

The remaining insoluble material was placed in a vacuum sublimator containing dry ice/acetone in its inside tube and the sublimator was connected to vacuum for about two hours. Solid white crystals were collected. An electron spin resonance spectra was taken of the white crystals after complete reduction of the mixture with excess potassium, and compared to spectra simulated by computer in accordance with: Stevenson, Reiter, and Sedgwick, "Thermal Generation Of The [16]-Annulene Anion Radical From The [8]-Annulene Anion Radical" 105 Journal Of The American Chemical Society 6521, (1983) to provide quantification. A ratio of naphthalene to napthalene-$d^8$ of 1:1 was obtained.

EXAMPLE III

Equal amounts of a 50/50 by-weight mixture of nitrobenzene-14N ($B_zNO_2$) and nitrobenzene-15N ($B_zNO_2$-15) was sealed within a glass capillary tube as reactant.

The capillary tube was placed within a glass bulb and potassium metal, as an electron transfer agent, was distilled with the use of a bunsen burner, under vacuum, into the bulb creating a potassium mirror on the sides of the bulb.

Approximately 25 milliliters of tetrahydrofuran (THF) was distilled into the bulb having therein the nitrobenzene containing capillary tube, under vacuum, from another bulb containing THF over sodium-potassium alloy used for drying the THF. After the THF was distilled over, the bulb was sealed and shaken until the capillary tube was broken. The solid napthalene and naphthalene-$d_8$ were allowed to dissolve. After the solid had dissolved, the bulb was tipped to pour the solution over the potassium mirror. The potassium mirror then dissolved and the solution became dark orange color.

The THF was then distilled over into a second evacuated bulb containing excess potassium by connecting the second bulb to the first bulb and placing the second bulb in a dry ice/acetone bath ($-78°$ C.). This left a residue in the first bulb of the solid salts $B_zNO_2$-.., $K^+$ and $B_zNO_2$-.-15, $K^+$ and the liquid mixture of $B_zNO_2$ and $B_zNO_2$-15. The liquid was then distilled by gentle warming into the bulb containing the excess potassium. An electron spin resonance spectra was taken on the completely reduced nitrobenzenes in the second bulb and compared to spectra simulated by computer in accordance with Stevenson, Reiter, and Sedgwick, "Thermal Generation Of The [16]-Annulene Anion Radical From The [8]-Annulene Anion Radical" 105 Journal Of The Americal Chemical Society 6521, (1983). The results showed that there was a greater percentage of $B_zNO_2$ than the $B_zNO_2$-15.

EXAMPLE IV

Equal amounts of a naturally occurring mixture of isotopic compounds of bis-diphenyl chromium would be sealed within a glass capillary tube as reactant. The capillary tube would be placed within a glass bulb and potassium metal, as an electron transfer agent, would be distilled with the use of a bunsen burner, under vacuum, into the bulb creating a potassium mirror on the sides of the bulb.

Tetrahydrofuran (THF) would be distilled into the bulb, under vacuum, from another bulb having therein the bis-diphenyl chromium containing capillary tube containing THF over sodium-potassium alloy used for the drying the THF. After the THF would be distilled over, the bulb would be sealed and shaken until the capillary tube would be broken. The solid bis-diphenyl chromium isotopic compounds would be allowed to dissolve into the THF. After the solid dissolved, the bulb would be tipped to pour the solution over the potassium mirror. The potassium mirror would then dissolved.

The bulb would be submerged in 600 milliliters of deionized and distilled water and broken open, allowing the solution to react.

The reaction of the THF solution would provide a Birch reduction of the anion radicals of bis-disphenyl chromium isotopic compounds with water.

The resulting aqueous solution would be transferred to a separatory funnel and washed with ethyl ether. The ether extract would be dried over sodium sulphate ($Na_2SO_4$). The ether solution would be decanted off the drying agent and a fractional distillation performed to remove all except approximately 5 milliliters of the ether. The remaining ether would be removed by blowing nitrogen gas over it, leaving an oily mixture. The oily mixture would be separated by high pressure liquid chromatograph means and would show the original isotopic ratio enriched.

EXAMPLE V

A molecular beam of nitrobenzene would be collided with a molecular beam of potassium to generate gas phase anion radicals which could be reacted to provide an enriched isotopic mixture.

EXAMPLE VI

A solid rod of sodium perchlorate and naphthalene would be made by evaporating a solvent such as tetrohydrofuran from a solution of sodium perchlorate and naphthalene. A DC electrical current would be passed through the rod to generate solid phase anion radicals. The rod would be quenched with water to provide a Birch reduction of the anion radicals. The rod would be submerged in water and dispersed. The resulting aqueous solution would be transferred to a separatory funnel and extracted with diethyl ether and dried over sodium sulphate ($Na_2SO_4$). The ether solution would be decanted off the drying agent and a fractional distillation would be performed to remove all except approximately 5 milliliters of the ether. The remaining ether would be removed by blowing nitrogen gas over it, leaving an oily mixture.

The oily mixture would be placed in a vacuum sublimator containing dry ice/acetone in its inside tube and the sublimator connected to vacuum. Solid crystals were collected, and analyzed by electron spin resonance and mass spectroscopy.

While there has been described above in the specification including the examples, embodiments of this invention in connection with specific reactants and the like, it is to be understood that this description is made only by way of example and not as a limitation on the scope of the invention.

What is claimed is:

1. A method of isotope enrichment comprising:
providing a mixture of at least a first isotopic compound and a second different isotopic compound of the same reactant, said first isotopic compound having atoms of a first isotope of an element, said second isotopic compound having atoms of a second isotope of said element, said first and second isotopes of said element being covalently bonded to said reactant, introducing an electron transfer agent into said mixture to form a reaction mixture, said electron transfer agent facilitating the transfer of electrons interactive with the nuclei of said element, said electron transfer agent being in an amount sufficient upon reaction of said mixture to establish an electron exchange equilibrium between an electron rich reaction product and an electron poor reaction product and being in an amount insufficient upon reaction of said mixture to drive said reaction to completion, reacting said reaction mixture until said equilibrium is established, and separating said electron poor reaction product from said electron rich reaction product.

2. The method of isotope enrichment of claim 1 wherein said electron poor reaction product is an intermediate.

3. The method of isotope enrichment of claim 1 wherein said electron rich reaction product is an intermediate.

4. The method of isotope enrichment of claim 1 wherein said equilibrium is between a substantial amount of an electron rich reaction product and a substantial amount of an electron poor reaction product.

5. The method of isotope enrichment of claim 1 wherein said reactant is conjugated.

6. The method of isotope enrichment of claim 5 wherein said reactant is a hydrocarbon.

7. The method of isotope enrichment of claim 1 wherein said reacting step further comprises an oxidation-reduction reaction.

8. The method of isotope enrichment of claim 7 wherein said electron transfer agent is added in an amount insufficient for completion of said oxidation-reduction reaction.

9. The method of isotope enrichment of claim 1 wherein said element is covalently bonded to said reactant by delocalized covalent bonding.

10. The method of isotope enrichment of claim 1 wherein said reactant is a reaction intermediate.

11. The method of isotope enrichment of claim 1 wherein said mixture comprises a naturally occurring mixture of isotopic compounds.

12. The method of isotope enrichment of claim 1 wherein said electron transfer agent is an electrical current.

13. The method of isotope enrichment of claim 1 wherein said separating step further comprises secondly reacting said product of said reacting step by a reaction having differential reactivity for said electron rich reaction product and said electron poor reaction product.

14. The method of isotope enrichment of claim 1 wherein said electron rich reaction product is anionic and wherein said electron poor form of said compound is neutral.

15. The method of isotope enrichment of claim 1 wherrein said electron rich reaction product is neutral and wherein said electron poor form of said reactant is cationic.

16. The method of isotope enrichment of claim 1 wherein one of said reaction products is a radical.

17. The method of isotope enrichment of claim 16 wherein one of said reaction products is an anion radical.

18. The method of isotope enrichment of claim 16 wherein one of said reaction products is a cation radical.

19. The method of isotope enrichment of claim 16 wherein one of said reaction products is a neutral radical.

20. The method of isotope enrichment of claim 1 wherein said reactant is nonacidic by the Lowry-Bronstead acid-base definition.

21. The method of isotope enrichment of claim 1 further comprising the step of dispersing said mixture.

22. The method of isotope enrichment of claim 21 wherein said dispersing step further comprises solubilizing said mixture.

23. The method of isotope enrichment of claim 22 wherein said mixture is solubilized in a solvent nonreactive with said reactant.

24. The method of isotope enrichment of claim 1 wherein said reactant is aromatic.

25. The method of isotope enrichment of claim 1 wherein said electron transfer agent is from the group consisting of electrical current, oxidizing agents, and reducing agents.

26. The method of isotope enrichment of claim 1 wherein said isotopic compounds have a saturated portion and a unsaturated portion and said atoms are in proximity to said saturated portion.

27. The method of isotope enrichment of claim 1 wherein said mixture is in the solid phase.

28. The method of isotope enrichment of claim 28 wherein said mixture is interdispersed with an electrolyte and wherein said electron transfer agent is an electrical current.

29. The method of isotope enrichment of claim 1 wherein said reactant is in the gas phase.

30. The method of isotope enrichment of claim 1 wherein said electron poor reaction product is said first isotopic compound.

31. The method of isotopic enrichment of claim 1 wherein said electron rich reaction product is said first isotopic compound.

32. The method of isotopic enrichment of claim 1 wherein said first isotopic compound is electron rich.

33. The method of isotopic enrichment of claim 1 wherein said second isotopic compound is neutral.

* * * * *